United States Patent [19]
Columbo

[11] 3,724,314
[45] Apr. 3, 1973

[54] FINGER TRAINING DEVICE FOR STRINGED MUSICAL INSTRUMENTS

[76] Inventor: Christopher Columbo, 1759 79th Street, Brooklyn, N.Y. 11214

[22] Filed: May 18, 1972

[21] Appl. No.: 254,754

[52] U.S. Cl. .........................84/465, 84/281, 84/328
[51] Int. Cl. ............................................G09b 15/06
[58] Field of Search........84/281, 328, 465, 467, 468, 84/470, 485

[56] References Cited

UNITED STATES PATENTS

| | | | |
|---|---|---|---|
| 505,745 | 9/1893 | Barclay | 84/467 UX |
| 2,240,696 | 5/1941 | Gusman | 84/281 |
| 2,918,836 | 12/1959 | Worrel | 84/465 |

FOREIGN PATENTS OR APPLICATIONS

| | | | |
|---|---|---|---|
| 588,731 | 2/1925 | France | 84/281 |
| 20,671 | 1/1883 | Germany | 84/467 |
| 252,928 | 10/1912 | Germany | 84/468 |
| 1,030,152 | 5/1958 | Germany | 84/470 |

Primary Examiner—Richard B. Wilkinson
Assistant Examiner—John F. Gonzales
Attorney—Samuel Lebowitz

[57] ABSTRACT

A finger training device for the proper manipulation of the fingers in the course of playing a stringed instrument, constituted by a restraining bar which is adjustably positioned above the fingers as they move along the finger board of the instrument. A flexible, but self-sustaining rod is connected between the restraining bar and a wrist-band adapted to be mounted on the wrist adjacent to the hand which supports the neck of the instrument, and along which the fingers glide for variably contacting the musical strings running therealong. Furthermore, universal joints at each end of the flexible rod facilitate the setting of the bar any desired distance above the fingers to restrain the undue lifting thereof from the strings.

5 Claims, 6 Drawing Figures

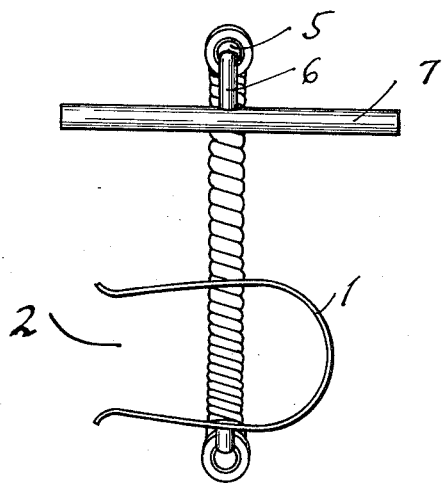
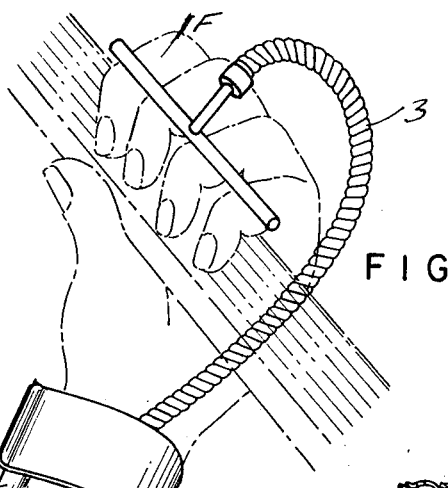
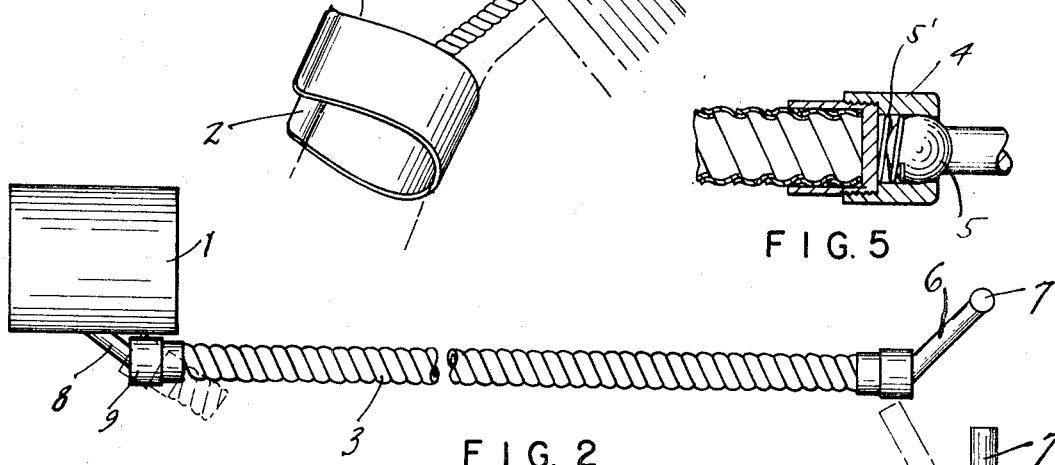
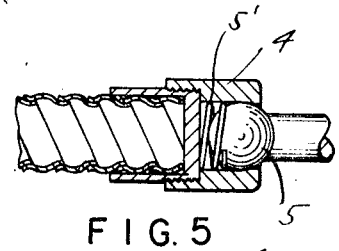
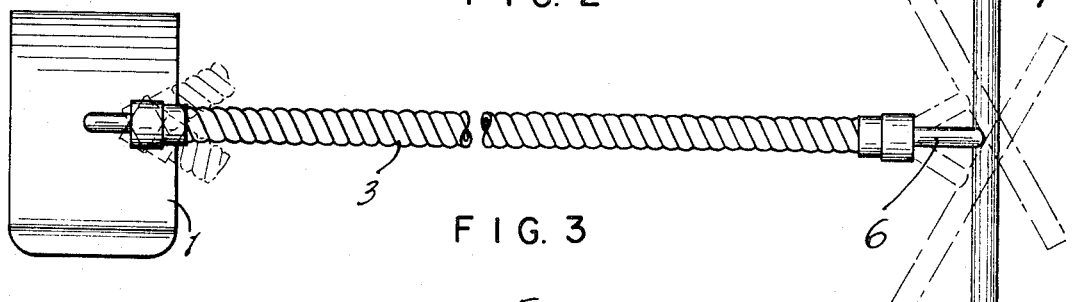
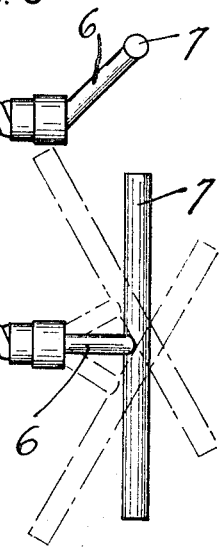
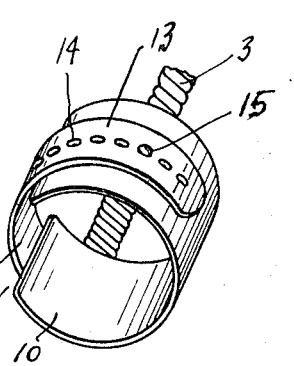

FINGER TRAINING DEVICE FOR STRINGED MUSICAL INSTRUMENTS

This invention relates to a finger training device for stringed musical instruments, and more particularly to a device acting as a restraint against faulty raising of the fingers as the musician's hand travels along the neck or finger board of musical instruments such as banjos, guitars, violins, etc.

It is the object of the present invention to provide a rugged and reliable device which may be operated very simply to develop a "walking finger" technique and to restrain the undue lifting of the fingers as the player moves them along the finger board of the instrument to sound the various desired musical notes.

It is another object of the invention to provide a training device of low cost which is universally adaptable to the needs and the physical requirements of a wide range of players and students.

Other objects and purposes will appear from the detailed description of the invention following hereinafter, taken in conjunction with the accompanying drawings, wherein FIG. 1 is a perspective view of the device and its adaptability to the hand supporting a stringed musical instrument, the latter of which are shown in dotted lines;

FIG. 2 is a front elevation of the device with the adjustability thereof adjacent to the wrist-band indicated in dotted lines;

FIG. 3 is a bottom view of FIG. 2 with the adjustability capabilities of the device at both ends thereof indicated in dotted lines;

FIG. 4 is a right end view of FIG. 3;

FIG. 5 is a longitudinal sectional view of the device at the junction of the flexible rod and restraining bar unit; and FIG. 6 is a perspective view of another embodiment of the wristband.

In the drawings are shown a wrist-band 1 formed of resilient sheet material of metal, plastic or the like, having an open gap 2 to enable the device to be slipped onto the wrist of the operator and to be resiliently retained thereon.

A flexible rod 3, of tubing which may be fabricated from metal or plastic, has one end thereof connected to the exterior surface of the wrist-band 1 by means of a projection 8 onto which is mounted a sleeve of a universal joint 9 in which is seated a spherical element constituting the end of the flexible rod 3. As shown in FIG. 2, the rod 3, which may resemble the support of "goose-neck" lamps, and the like, and which may be constituted by spirally banded tubing similar to the sheathing of BX cable or spiral plastic bands, extends from the sleeve of the universal joint 9 for a length of a foot or foot and a half, and terminates at the opposite end in another universal joint constituted by a sleeve 4 into which is seated a spherical bearing 5 and the tightness of which is controlled by a spring 5'. The spherical ball 5 is interconnected with a shank 6, at the opposite end of which is mounted a transverse bar 7 of any suitable material, such as metal or plastic. Preferably, the shank 6 is connected to the mid-portion of the bar 7 to impart a desirable degree of balance to the device.

The capability of adjustment of the flexible rod 3, which although flexible is mechanically self-sustaining once an adjustment is made, is cominative with combinative angular adjustments which may be made at either or both ends thereof. The latter capability is indicated in dotted lines in FIG. 3. The angular positioning of the flexible rod 3 adjacent to the wrist-band 1, as well as the capability of universal movement of the restraining bar at the opposite end of the flexible rod, in conjunction with the flexing of the rod 3 anywhere along its length, permit the latter to be moved relative to the wrist-band, so that the terminal bar 7 may be brought into overlying relation to the neck or finger board of the musical instrument into any desired spacing with respect to the fingers F of the operator's hand. This spacing is maintained with uniformity as the hand and fingers are slid along the finger board of the musical instrument and serve to restrain any undesirable lifting movements of the fingers as they move along the neck of the instrument in the course of eliciting the proper musical notes as the fingers move longitudinally along the strings and transversely in the course of the selection of the proper strings. This restraint aids in the development of the "walking finger" technique.

While the arrangement shown in FIGS. 1 to 4 illustrate a desirable wrist-band which may be applied rapidly and easily to the wrist of the musician, and detached therefrom, FIG. 6 illustrates a variant form of wrist-band. In this case, the band 10 may be formed of sheet material of metal or plastic and an extension 11, affixed to one side of the band, bridges the opening 12 between the ends thereof. The free portion 13 of the extension overlaps the opposite side of the band. Any suitable fastening arrangement, such as a plurality of openings 14 on extension 11 may cooperate with a pin 15 on the fixed side of the band to accommodate comfortably the wrist of the player by selectively coupling the pin 15 with one of the openings 14. The same result may be attained by using cooperating snap fasteners, hooks and eyes, "Velcro" tape, and the like.

I claim:

1. A finger training device for stringed musical instruments comprising
   a. a band adapted to be mounted on the wrist of the musician adjacent to the hand supporting the neck of the stringed instrument,
   b. an adjustable self-sustaining flexible rod connected to said band at one end thereof,
   c. a transverse bar adjustably connected to the opposite end of said flexible rod, and
   d. a universal joint at said last-mentioned end for permitting any desired positioning of said transverse bar above the fingers of said hand adapted to function as a restraint on the lifting movement of the fingers from the strings as the hand is moved along the neck of the musical instrument.

2. A device as set forth in claim 1, wherein said flexible rod is a spiral tubing of cylindrical cross-section.

3. A device as set forth in claim 1, including a stem connected to an intermediate portion of said transverse bar, with the free end of said stem connected to said universal joint.

4. A device as set forth in claim 3, wherein said wristband is formed of resilient sheet material provided with a gap between the free ends thereof which is adapted to be snapped onto the wrist of the musician, and a second universal joint connected to the outer face of said band for mounting said first-mentioned end of said flexible rod for universal movement.

5. A finger training device as set forth in claim 3, wherein said wrist-band is formed of sheet material of generally cylindrical cross-section with a gap between the ends thereof, and an extension on one of said ends adapted to overlap the other with adjustable fastening means therebetween.

* * * * *